May 9, 1961 J. J. OBERLY 2,983,823
OPTICAL RADIATION GENERATING AND DETECTING DEVICE
Filed May 21, 1956 2 Sheets-Sheet 1

INVENTOR.
JOHN J. OBERLY
BY Roland A. Dexter
HIS ATTORNEY

May 9, 1961 J. J. OBERLY 2,983,823
OPTICAL RADIATION GENERATING AND DETECTING DEVICE
Filed May 21, 1956 2 Sheets-Sheet 2
FIG. 3
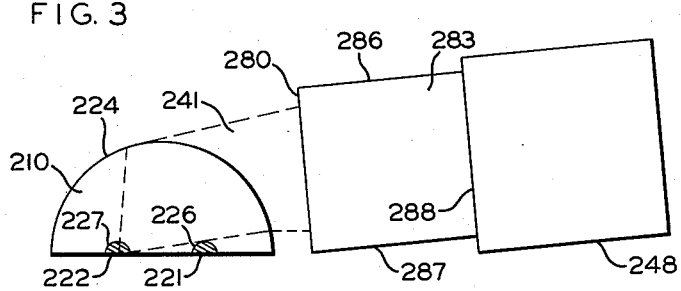
FIG. 4
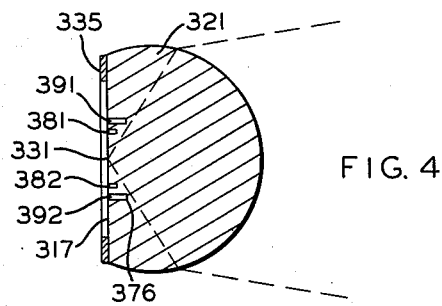
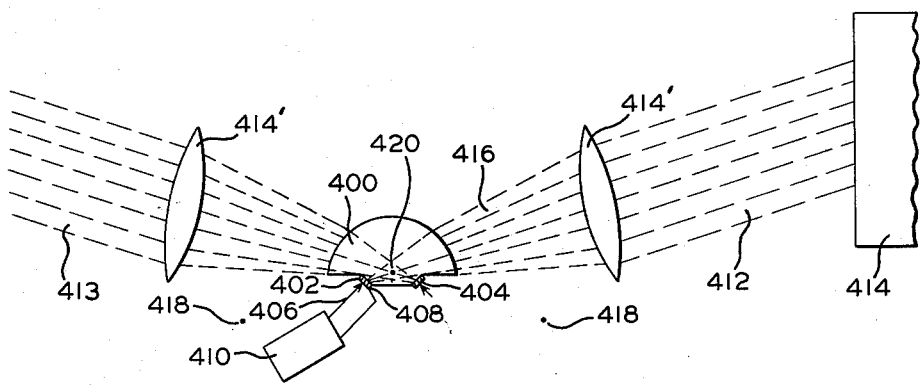
FIG. 5
INVENTOR.
JOHN J. OBERLY
BY Roland A Dexter
HIS ATTORNEY

United States Patent Office 2,983,823
Patented May 9, 1961

2,983,823

OPTICAL RADIATION GENERATING AND DETECTING DEVICE

John J. Oberly, Williamstown, Mass., assignor to Sprague Electric Company, North Adams, Mass., a corporation of Massachusetts Filed May 21, 1956, Ser. No. 586,092

3 Claims. (Cl. 250—211)

The present invention relates to constructions that generate and detect optical radiation and more particularly by the recombination or generation respectively of carriers in a semiconductor body.

The detection of optical radiation from numerous sources not from the same direction requires complex equipment having a plurality of sensing elements. Conversely where it is necessary to generate optical radiation in multi-directional beams, numerous generators are required. These equipments are complex in character and bulky in dimension.

An object of this invention is to overcome the foregoing and related disadvantages of the prior art.

Another object of this invention is the provision of an effective generating or detecting device for optical radiation.

A further object of the present invention is the process of an apparatus which can be used both for multi-directional generation or detection of optical radiation.

The above, as well as additional objects of the invention, will be more fully understood from the following description of several of its exemplifications, reference being made to the accompanying drawings, wherein:

Figs. 2, 3 and 4 are similar views of modified forms of radiation generating arrangements representative of the invention; and, Fig. 5 is a simplified sectional view of one form of radiation detecting arrangement in accordance with the present invention.

According to the present invention, a radiation generator has an asymmetrically conductive semiconductor contact zone as a radiation source, said zone being part of a semiconductor body in which it is opposite a polished flat surface, a body of moldable material transparent to the radiation emitted by the source, said transparent body having an index of refraction for that radiation which is substantially the same as the index of refraction of the semiconductor body for that radiation, the transparent body being molded directly against the flat surface and shaped to form a portion of a polished sphere having a radius at least about the longest dimension of the flat surface, with this surface located so that the apparent source of radiation is at an internal aplanatic point of the sphere and facing in the direction of the emerging radiation.

The sphere portion can be molded against a plurality of semiconductor plates each located at a different internal aplanatic point so as to provide a corresponding plurality of separate optical radiation beams. Also the semiconductor plates can be replaced by semiconductor bodies having other shapes, such as hemispherical, that are simple to provide. When hemispherical with the radiation formed at the center, substantially all of the radiation emerges from the semiconductor body. The entire assembly can be made of semiconductor material for radiation generator applications.

Figure 1:
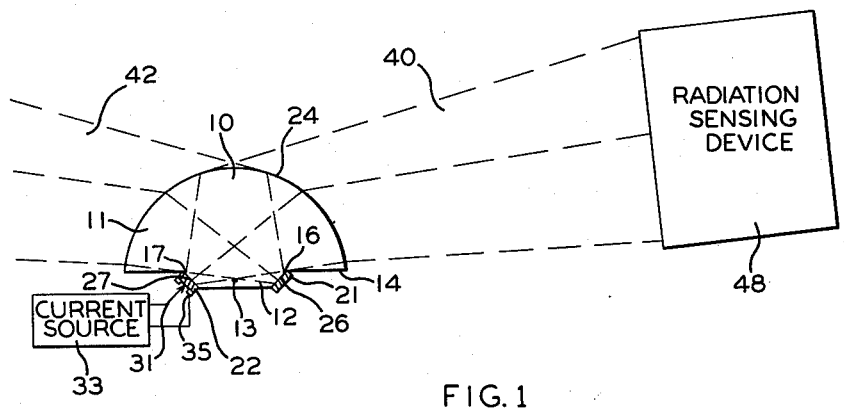
Fig. 1 is a simplified sectional view of one form of a radiation generating arrangement in accordance with the present invention.

Referring now to the drawings, Fig. 1 shows a member 10 molded from silver chloride into the shape of hemisphere 11 with a projection 12 forming a base-like extension or pedestal, near the center 13 of the sphere, and with an annular reduction or undercut 14 around the pedestal. The sides of the pedestal 12 include faces 16, 17 which taper inwardly as they extend downwardly away from the hemispherical body 11. Against these faces are held semiconductor bodies 21, 22 as by having the silver chloride molded directly against these bodies. Suitable semiconductor materials are germanium, silicon and intermetallic compounds such as gallium phosphide.

The spherical surface of member 10 is preferably polished, as by using highly polished molding dies in shaping this member. The flat surfaces 26, 27 of semiconductor bodies 21, 22 where they engage the faces 16, 17 of member 10 should be preferably highly polished and flat to effect the highest transmission of radiation. The semiconductor bodies are preferably of a relatively minute size such as plates 20 mils wide, 40 mils long and 10 mils thick to ensure that the emerging radiation is from a small or point source. Against the back surface of each semiconductor body there is applied an electrode for the generation of radiation. Such an electrode is indicated at 31 and provides an asymmetrically conductive contact against the semiconductor body as by having the electrode of the fused junction type with the electrode wire soldered to an indium dot which is fused to the n-type germanium body. Another electrode elsewhere, aside from the radiation emergent face, provides an ohmic contact to complete the circuit to the current source. The passage of electric current from the fused junction electrode to the semiconductor body in the forward direction, that is with this electrode more positive than the body, causes the generation of minority current carriers at the junction of the differently conductive semiconductor regions. These minority carriers diffuse outwardly from the junction and combine with the majority carriers that are inherently present in their respective regions, causing radiation to be generated. A current source for this purpose is illustrated at 33, the current circuit being established by a lead to the electrode 31, and another lead to an ohmic or non-rectifying electrode 35 such as ordinary tin-lead solder containing antimony, adherently fused to the semiconductor body. A current of only about 1 milliampere under the above conditions will generate substantial radiation, as is indicated in the Haynes et al. article in Bulletin of the American Physical Society, vol. 27, page 14 (1952).

The wave length of the radiation is dependent on the semiconductor from which it is emitted. Radiation from germanium is not in the visible spectrum, but is in the infrared region, having wave lengths of about 1.85 to 2.05 microns. The germanium plate 22 is transparent to this radiation as is the AgCl body 10. However, the body 10 has a different index of refraction for this light than the germanium. That of the AgCl is about 2.5 and that of the germanium about 4, the ratio between them being about 1.6.

With this arrangement, a relatively wide bundle of radiation originating from the junction area of the plate penetrates through the plate, spreads out in the body 10, and emerges as a diverging half cone 40. The apex half-angle of cone 40 is approximately that angle the sine of which is $$\frac{1}{\text{index of refraction of body 10}}$$

An internal aplanatic point is a point spaced from the spherical center by a distance equal to $$\frac{\text{spherical radius}}{\text{index of refraction of body 10}}$$

The half-cone appears to then have an apex at an external aplanatic point which is complementary to the internal aplanatic point and lies on the line that passes from the spherical center through the internal aplanatic point and a distance from the center equal to the spherical radius multiplied by the index of refraction of the body 10.

When determining the location of the plate 22 at an internal aplanatic point, it is usually not necessary to correct for the thickness of the semiconductor plates. That is to say, the radiation originates at a semiconductor junction zone which is at least a few mils away from face 27 for example. However, due to the refraction of the emerging radiation as it enters the body 10 at surface 17, the radiation in body 10 appears to originate from a zone having a fraction of its actual depth in the plate. The apparent source of the radiation should be located at substantially the internal aplanatic point. However, for spherical radii of about 100 mils or more a separation of several mils between the apparent radiation source and the internal aplanatic point has little significance.

For best results the plate 22 should have a surface 27 that faces in the direction of the useful radiation from that surface. In other words, with the construction of Fig. 1 the surface 27 would face approximately the direction of the central portion of the radiation that forms half-cone 40. Because the degree of refraction decreases from the upper portion of the cone illustrated in the figure, to the lowest portion, it is usually preferred to orient surface 27 so that it faces about 5° or so below the path of the exact center. This gives somewhat less loss due to the internal reflection that accompanies the refraction.

In addition to providing the radiation 40, an oppositely directed half-cone of radiation 42 is shown as generated by the second late 21. The two cones are formed in exactly the same manner and are pointed in opposite directions. More than two plates can be provided around the periphery of pedestal 12. Inasmuch as with bodies 10 having an index of refraction of about 2.5, the widest vertex half-angle of the emerging cones such as 40, is about 25°, the cones can be oriented more than 50° from each other to insure that their radiation beams are separately distinguishable. Seven plates can accordingly be uniformly distributed around the pedestal 12. However, it is somewhat simpler to use six radiation sources since the geometry of hexagonal bodies is easier to manipulate.

The undercut 14 need not be provided, and the hemisphere 11 can be complete with the plates molded against the plane surface of the hemisphere. This construction does not permit as effective utilization of the radiation emergent from the semiconductor plate.

Each cone of radiation can be arranged to cooperate with a detecting arrangement such as a radiation sensing device indicated at 48 in Fig. 1. A suitable radiation sensing mechanism is merely a photoelectric cell sensitive to the generated radiation. Other types of sensing devices such as bolometers, phototransistors, or even photographic instruments such as film sensitive to the radiation can be used.

The separate radiation beams generated by an apparatus of the type shown in Fig. 1 need not be made completely without overlap. Even appreciable overlapping can be tolerated where the apparatus is arranged with lenses to project an image of the radiation source, so long as the individual radiation sources are spaced apart by a distance sufficient to enable resolution of their images.

Figure 2:
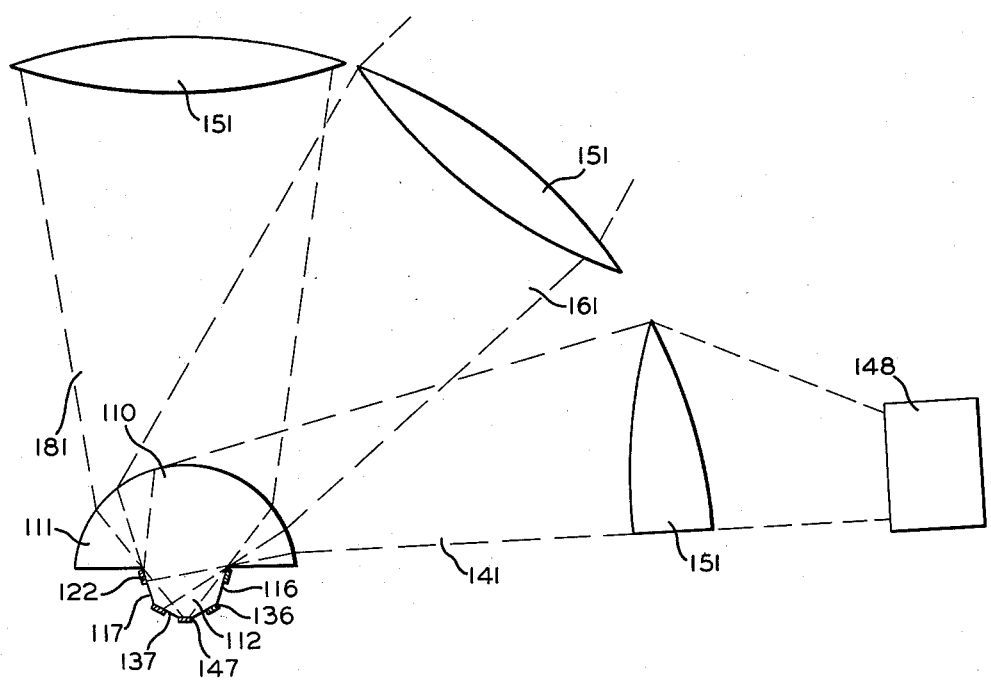

Fig. 2 shows a construction similar to Fig. 1 but crowding a great many more radiation sources against a single body 110. In this construction the pedestal portion is enlarged to provide a multi-faceted base 112. Where the base joins the spherical portion 111, there is positioned a ring of faces, two of which are shown in 116, 117. Below this ring there is a second ring of faces, two of which are indicated at 136, 137. Finally at the very bottom, there is a single face 147. Each of the faces can be provided with a semiconductor plate as indicated at 122, to provide the separate radiation sources, each at an internal aplanatic point. The uppermost ring can have up to six or seven plates in the manner described above in connection with Fig. 1, or it can have up to 12 or even 18 uniformly distributed plates that provides overlapping cones. For each conical beam 141, a separate lens as indicated at 151 is provided so that the beam is focussed at a sensing device 148 for example. Even with the thickest concentration or radiation sources and, therefore, with substantial overlapping of the individual cones, the action of the separate lenses can be arranged so as to focus on a desired spot an image of the particular radiation source being detected. By reason of the overlapping, many lenses will also project images of an adjacent radiation source, and the additional images can be arranged to fall upon insensitive material.

The next lower circle of plates will have less room and will, therefore, generally provide only enough space for about half as many radiation sources as the uppermost circle. The individual cones 161 from this ring will be more circular and will have somewhat larger minimum apex half-angles. A cone 181 produced from the body at surface 147, will be still larger.

The faces of the individual semiconductor plates are preferably arranged so that the maximum amount of radiation emerges in th cones. In general, all the plates should therefore face as indicated with respect to Fig. 1. A slight upward tilt of the two uppermost rows of plates, that is tilting upwards from the horizontal, is helpful.

In addition to making semiconductor bodies in the form of plates, they can be also readily made in the form of hemispheres or portions of hemispheres. Fig. 3 shows a construction in accordance with the invention using hemispherical semiconductor bodies 222 and 221. These semiconductor bodies are embedded in a large hemispherical refracting body 210, in such a manner that the spherical centers of the semiconductor hemispheres are at the internal aplanatic points of the body 210. As in the other examples, the hemispherical surface 227 and 226 of the semiconductor bodies, and the hemispherical surface 224 of body 210, should be polished for maximum radiation output.

In the construction of Fig. 3, radiation generated at the centers of the semiconductor bodies would penetrate through the refractive body 210 without appreciable change in direction, and upon emerging from body 210 will become refracted into a generally flattened or half-cone 241. In the construction of this figure, each half-cone of radiation can be directed at an input face 280 of a radiation conduit 283 made of suitable transparent material with polished surfaces such as the same material used in the construction of body 210. A conduit of this type will trap the incoming radiation so that none will escape from the side surfaces 286, 287. The entering radiation will emerge from the exit end 288 of the conduit where it can impinge upon a radiation sensing device 248. Conduit 238 can be either straight or can be curved to lead the radiation in any desired direction. Similar conduits can be provided for each emerging beam if desired. Alternatively lenses can be used in place of the conduit 283 or conduits can be used in place of the lenses in Fig. 2.

Fig. 4 shows a modified form of the invention in which a semiconductor body 321 is used by itself to emit the desired cones of radiation. The body 321 is in the general shape of a sphere cut so as to have a flat face 317 lying in a plane passing through an aplanatic point.

At this point an electrode 331 for a radiation generating source of current is applied. Around this electrode are placed a series of further electrodes 381, 382. These can form a ring around the central electrode, but the contact sites for the electrodes 381, 382 are arranged to be at the bottom of depressions 376. Such depressions are readily provided by ultrasonic drilling, or by the electrolytic etching technique described in U.S. patent application Serial No. 460,835, filed October 7, 1954, now abandoned, so as to bring the electrode contact site near an aplanatic location as described previously. Individual depressions can be provided for the individual electrodes or one ring-like depression can be provided for all of them.

Around the electrodes 381, 382, there is shown provided a second ring of electrodes 391, 392 similarly located in depressions with their contact sites near the aplanatic locations. A common return or non-rectifying electrode 335 is shown for all the plates, although individual return electrodes can be provided for one or more of them.

Where the body 321 is a highly refractive material such as germanium, the cones of radiation generated by the individual sources are relatively narrow, that is they have about a 14½° apex half-angle. Accordingly, if the cones are to be kept from overlapping, the sites should be about 30° apart. Where the depressions are made in the form of continuous rings, they will also mask off the side edges of the generated radiation so as to further limit the size of the cones in a manner similar to that shown in Fig. 2. In any event, the narrowness of the individual cones permits having as many as 12 electrodes in a ring about 60° away from electrode 331, without having any of the 12 overlapping. Six electrodes can also be placed in the inner ring. A third set of 12 electrodes can also be placed, if desired, as a third ring around the central electrode, this ring being drilled to such a depth that the plane of its bottom face passes through the spherical center of body 331 and is parallel to surface 317.

As in Figs. 2 and 3, lenses or radiation conduits can be provided for any or all of the radiation cones in the construction of Fig. 4. The electrodes of the various constructions, furthermore, need not provide point type contacts, but can provide linear or even area type contacts. For example, a single ring-shaped electrode can be used in the ring depressions of Fig. 4 generating a beam of radiation in the form of a hollow conical shell. The rectifying electrode and the resulting radiation beam can be made in any shape which may be required, subject only to keeping its various parts sufficiently separated to prevent any undesired amount of overlapping of the corresponding portions of the beam. Thus, if the surface to which the rectifying electrodes are to be attached is composed entirely of internal aplanatic points, and thus is itself a hemisphere of radius equal to that of the large hemisphere divided by its index of refraction, any shape of electrode which can be applied to this surface will produce a radiation beam of corresponding shape. With such large rectifying electrodes, heating effects of the electric current will become appreciable, and may need attention. The non-rectifying contact, for example, can be made of a piece of massive metal that conducts heat away rapidly. Alternatively, the radiation generating current can be turned on only intermittently as pulses. The pulses of current produce pulses of radiation which can be used to transmit information by means of their length or spacing and which make undesired detection of the radiation beam more difficult since they exist for only a short time. Another technique for improving the dissipation of heat is to use a plurality of separate radiation generating electrodes which give overlapping beams rather than one extended area contact electrode, when a resultant beam shape such as a hollow conical shell is desired.

The preceding description has implicitly considered the case in which only one rectifying electrode is activated at a time, producing only one corresponding radiation beam. In general, the electrodes may be activated in any desired combination to produce a number of radiation beams simultaneously, and, of course, this pattern can be varied at will.

The preceding description has been concerned with the use of rectifying electrodes biased in the forward direction in combination with an ohmic electrode to complete the electrical circuit. However, the ohmic electrode can be omitted and the signal voltage or current can be applied between two rectifying electrodes. In this case the rectifying electrode which is biased in the reverse direction will tend to limit severely the current which passes through the other and thus the amount of radiation which it produces. However, this limitation can be overcome by applying a sufficiently high signal voltage to cause breakdown of the reverse-biased electrode so that the required amount of current will flow in the circuit. Under these conditions, the power dissipation at the reverse-biased electrode is large, but the use of intermittent or pulsed signals will prevent injury to the device.

The power dissipated at the reverse-biased electrode can also be rendered less critical if the device includes several electrodes by connecting in parallel all of the electrodes except the one to produce the desired radiation beam, and using them all together as the reverse-biased electrode, allowing each one to dissipate only a portion of the total power.

The use of two rectifying electrodes to make a complete circuit also permits switching the device from the one corresponding radiation beam to the other by merely reversing the polarity of the applied signal voltage. This is in contrast to operation when an ohmic electrode completes the circuit which involves switching of the external connections to the corresponding rectifying electrodes.

Although only the configuration of electrodes shown in Fig. 4 has been discussed for the case in which the entire body of material is a single piece of semiconductor, it should be understood that the configurations of electrodes shown in Figs. 1, 2 and 3 and any other which utilize this principle of generating radiation beams are entirely applicable to the case where the entire body is semiconducting material. The use of hemispheres of transparent optical material as shown in Figs. 1 and 2 has the advantage in some cases of making the bulk of the device from less expensive material which can be more readily produced in a polished hemispherical shape.

As described previously, the nature of the recombination radiation emitted from a semiconductor depends very critically on the particular semiconductor from which it is emitted. Thus a large part of the radiation from germanium has wavelengths near 1.9 microns in the infrared spectrum, and that from gallium phosphide lies in the visible portion of the spectrum. With the arrangements shown in Figs. 1, 2 and 3 it is possible to produce radiation beams having wavelengths lying in different spectral regions by using two or more different semiconducting materials for the various plates or hemispheres. Furthermore, the nature of the emitted radiation also depends on the type and number of recombination centers in the semiconducting material at which the recombination radiation is formed. Thus a single semiconducting material such as germanium can also generate radiation in different spectral regions and can be used for the various plates of hemispheres of Figs. 1, 2 or 3 to produce radiation beams of different wavelength characteristics. Furthermore, within a single body of semiconducting material as in Fig. 4, regions containing various types of recombination centers can be produced in the desired recombination zones by diffusing corresponding types of impurities into the semiconductor body.

Instead of the silver chloride refractive bodies described above, other wellknown optical materials which can be used are KRS-5 (a mixture of thallium bromide and thallium iodide) and amorphous selenium which have a high index of refraction and can be readily molded to the required shapes as can artificial dielectrics such as colloidal silver in silver bromide. In general, it is preferred to use materials having the highest possible index of refraction so that the emitted radiation cones have the smallest possible half-angle and the greatest directionality effect is thereby achieved. Furthermore, if the index of refraction of the refractive body is nearly equal to that of the semiconductor body, there will be less loss of radiation by reflection when it passes the interface between the two materials. Because the index of refraction of the refractive body is so high, considerable reflection loss of radiation will occur at the interface between the refractive body and air, so it is advantageous to use a low-reflecting coating on the surface of the refractive body. Such low reflecting coatings must, of course, be transparent to the emerging radiation and are generally made of a material having an index of refraction intermediate between that of the refractive body and that of air (1.0). The thickness of such films is usually adjusted to obtain the greatest reduction of reflection in the particular spectral region of the radiation beam. Suitable materials for coating refractive bodies of germanium are, of course, the transparent optical materials described above—silver chloride, KRS-5, and amorphous selenium. Suitable materials for coating refractive bodies of these materials are various transparent plastics which have indices of refraction near 1.5.

The general and specific discussion of this invention has been primarily directed to multi-directional radiation utilizing the semiconductor plates as generators of the radiation. The invention in its true scope encompasses the detection as well as the generation of multi-directional radiation. To utilize the structure detailed heretofore for detection, one need merely transpose the sensing device for the radiation generator. Such a structure is graphically portrayed in Fig. 5, wherein asymmetrically conductive semiconductor contact zones are used as radiation detecting elements. The configuration and dimensions of the hemispherical body 400 with its attached semiconductor plates 402, 404 is substantially the same as that taught for Fig. 1. Plate 402 is shown having a rectifying electrode 406 and an ohmic contact 408 which are connected to the terminals of signal detector 410. Radiation 412 from a radiation generator 414 such as a fired artillery piece is condensed by lens onto the spherical surface of body 400. The incident radiation 416 impinges onto the flat and polished surface of detector element 402 and produces a current flow detectable in signal detector monitoring means 410. The center of lens 414' is on a line which includes the external aplanatic point 418, internal aplanatic point and spherical center 420 so that the condensed radiation is most efficiently detected by the detector element 402 or 404 whose junctions of the rectifying contacts are at their respective internal aplanatic points. Another one of the many lenses 414' that can be used for multidirectional detection of radiation is shown as condensing radiation 413 from another source 414 which radiation is incident on semiconductor plate 404. Current flow develops in plate 402 as a result of the incident radiation 413 detectable by apparatus not shown.

The application of my invention to detection is thus apparent and can readily be used in other embodiments set forth heretofore. This invention is thus satisfactorily used for detection and generation of optical radiation and the mere modification of the structure of an apparatus such as Fig. 1 by replacing current source 33 with a combined current generator and detector makes possible sequential generation and detection of optical radiation in the same or different directions, as for example, an automatic reply to a received signal from a given direction.

As many apparently widely different embodiments of this invention may be made without departing from the spirit and scope hereof, it is to be understood that the invention is not limited to the specific embodiments hereof except as defined in the appended claims.

I claim:
1. An optical radiation detecting device having an asymmetrically semiconductor contact zone as the radiation detecting element, said zone being part of a semiconductor body in which it is opposite a polished flat surface, a body of material transparent to said radiation and in the shape of a portion of a polished sphere contiguous with said flat surface, said transparent body having an index of refraction for said radiation which is substantially the same as the index of refraction of the semiconductor body for that radiation, said sphere having a radius at least about the longest dimension of the flat surface, said zone located substantially at an internal aplanatic point of the sphere and monitoring means connected to said detecting element.

2. A multi-directional optical radiation generator comprising a polished body of optical material having a substantially hemispherical portion and a multi-faceted pedestal portion extending centrally from said hemispherical portion, semiconductor plates on a plurality of the facets to provide a plurality of separate radiation sources each appearing at an internal aplanatic point of the hemisphere, said body being transparent to optical radiation of wavelengths greater than the threshold of the semiconductor, said body having an index of refraction for said radiation that is substantially equal to the index of refraction of the semiconductor, said semiconductor plates being in intimate contact with polished surfaces of said facets, and electrodes in asymmetrical conductive contact with said plates.

3. The generator of claim 2 wherein at least one of said plates is of a different semiconductor material than the other plates so as to produce radiation beams having wavelengths lying in different spectral regions.

References Cited in the file of this patent

UNITED STATES PATENTS

| | | |
|---|---|---|
| 2,692,950 | Wallace | Oct. 26, 1954 |
| 2,692,952 | Briggs | Oct. 26, 1954 |
| 2,861,165 | Aigrain | Nov. 18, 1958 |

UNITED STATES PATENT OFFICE
CERTIFICATE OF CORRECTION

Patent No. 2,983,823

May 9, 1961

John J. Oberly

It is hereby certified that error appears in the above numbered patent requiring correction and that the said Letters Patent should read as corrected below.

Column 3, line 19, for "merging" read -- emerging --; line 41, for "late" read -- plate --; column 4, line 17, for "or" read -- of --; line 65, for "238" read -- 283 --.

Signed and sealed this 31st day of October 1961.

(SEAL)
Attest:

ERNEST W. SWIDER
Attesting Officer

DAVID L. LADD
Commissioner of Patents
USCOMM-DC